(12) United States Patent
Choi et al.

(10) Patent No.: US 10,655,233 B2
(45) Date of Patent: May 19, 2020

(54) ELECTROCHEMICAL AND PHOTOELECTROCHEMICAL OXIDATION OF 5-HYDROXYMETHYLFURFURAL TO 2,5-FURANDICARBOXYLIC ACID AND 2,5-DIFORMYLFURAN

(71) Applicant: Wisconsin Alumni Research Foundation, Madison, WI (US)

(72) Inventors: Kyoung-Shin Choi, Fitchburg, WI (US); Hyun Gil Cha, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 313 days.

(21) Appl. No.: 15/421,750

(22) Filed: Feb. 1, 2017

(65) Prior Publication Data
US 2017/0145572 A1 May 25, 2017

Related U.S. Application Data

(62) Division of application No. 14/592,031, filed on Jan. 8, 2015, now Pat. No. 9,598,780.

(51) Int. Cl.
*C25B 3/02* (2006.01)
*C25B 9/00* (2006.01)
(Continued)

(52) U.S. Cl.
CPC .................. *C25B 3/02* (2013.01); *C25B 9/00* (2013.01); *C25B 9/06* (2013.01); *C25B 11/0405* (2013.01);
(Continued)

(58) Field of Classification Search
CPC .. C25B 1/003; C25B 3/02; C25B 9/00; C25B 9/06; C25B 11/0405; C25B 11/12;
(Continued)

(56) References Cited

U.S. PATENT DOCUMENTS

2012/0010068 A1* 1/2012 Zhao ...................... B01J 21/063
502/1
2013/0137882 A1* 5/2013 Borsotti ............... C07D 307/68
549/485

(Continued)

FOREIGN PATENT DOCUMENTS

JP 04362199 A 12/1992
PL 161831 B2 * 8/1993

OTHER PUBLICATIONS

Cottier et al. Oxidation of 5-Hydroxymethylfurufral and Derivatives to Furanaldehydes with 2,2,6,6,-Tetramethylpiperidien Oxide Radical—Co-oxidant Pairs. J. Heterocyclic Chem, 32, pp. 927-930. (Year: 1995).*

(Continued)

*Primary Examiner* — Ciel P Thomas
(74) *Attorney, Agent, or Firm* — Bell & Manning, LLC (57) ABSTRACT

Electrochemical and photoelectrochemical cells for the oxidation of 5-hydroxymethylfurfural to 2,5-furandicarboxylic acid and/or 2,5-diformylfuran are provided. Also provided are methods of using the cells to carry out the electrochemical and photoelectrochemical oxidation of 5-hydroxymethylfurfural to 2,5-furandicarboxylic acid and/or 2,5-diformylfuran.

14 Claims, 10 Drawing Sheets (51) Int. Cl.

| | |
|---|---|
| *C25B 11/04* | (2006.01) |
| *C25B 11/12* | (2006.01) |
| *C25B 9/06* | (2006.01) |
| *H01G 9/20* | (2006.01) |

(52) U.S. Cl.
CPC ........... *C25B 11/12* (2013.01); *H01G 9/2027* (2013.01); *H01G 9/2004* (2013.01); *Y02E 10/542* (2013.01); *Y02E 60/366* (2013.01); *Y02P 20/135* (2015.11)

(58) Field of Classification Search
CPC .. H01G 9/2027; H01G 9/2004; Y02P 20/135; Y02E 10/542; Y02E 60/366
See application file for complete search history.

(56) References Cited

U.S. PATENT DOCUMENTS

| | | | |
|---|---|---|---|
| 2014/0275679 A1* | 9/2014 | Sofranko | B01D 71/024 585/310 |
| 2014/0295508 A1* | 10/2014 | Yoshikuni | C07D 307/68 435/137 |
| 2015/0008139 A1* | 1/2015 | Saffron | C25B 3/04 205/455 |
| 2015/0292095 A1* | 10/2015 | Haber | C25B 11/0452 502/304 |
| 2016/0024669 A1* | 1/2016 | Jackson | C25B 3/04 205/450 |
| 2017/0250433 A1 | 8/2017 | Zhang et al. | |
| 2018/0023199 A1 | 1/2018 | Sun | |
| 2018/0142362 A1 | 5/2018 | Schouten et al. | |
| 2019/0071787 A1 | 3/2019 | Choi | |

OTHER PUBLICATIONS

Shin et al., Nanoporous Structures Prepared by an Electrochemical Deposition Process, Adv. Mater. 15, No. 19, 2003, pp. 1610-1614.

Nam et al., Effects of (NH4)2SO4 and BTA on the nanostructure of copper foam prepared by Electrodeposition, Electrochimica Acta 56, Aug. 16, 2011, pp. 9397-9405.

Singh et al., Growth of Different Nanostructures of Cu2O (Nanothreads, Nanowires, and Nanocubes) by Simple Electrolysis Based Oxidation of Copper, J. Phys. Chem, 111, Jan. 1, 2007, pp. 1638-1645.

Yin et al, Electrochemical Oxidation of Covellite (CuS) in Alkaline Solution, Journal of Colloid and Interface Science, vol. 166, Issue 1, Aug. 1, 1994, pp. 133-142.

Chen et al., Electro-Generation of Furfural Alcohol in Ni—P-mCMC/mCS Bipolar Membrane Equipped Electrolysis Cell, Advanced Materials Research, vols. 287-290, Jul. 4, 2011, Trans Tech Publications, pp. 564-568.

Venter et al., Optical and electrical properties of NiO for possible dielectric applications, South African Journal of Science, vol. 107, No. 1/2, Jan. 26, 2011, pp. 1-6.

Fox, Marye Anne, Synthetic Applications of 5,12 Photocatalytic Oxidation and Reduction Reactions of Organic Reactants on Irradiated Semiconductor Surfaces, Electron Transfer in Chemistry, Feb. 22, 2001, pp. 1-42.

Green et al., The Electrocatalytic Hydrogenation of furanic compounds in a continuous electrocatalytic membrane reactor, Green Chem., May 10, 2013, vol. 15, pp. 1869-1879.

Parpot et al., Electrochemical Investigations of the Oxidation-Reduction of Furfural in Aqueous Medium Application to Electrosynthesis, Electrochimica Acta, Oct. 9, 2003, vol. 49, pp. 397-403.

* cited by examiner

ELECTROCHEMICAL AND PHOTOELECTROCHEMICAL OXIDATION OF 5-HYDROXYMETHYLFURFURAL TO 2,5-FURANDICARBOXYLIC ACID AND 2,5-DIFORMYLFURAN

CROSS-REFERENCE TO RELATED APPLICATIONS

The present application is a divisional of U.S. patent application Ser. No. 14/592,031 that was filed Jan. 8, 2015, the entire contents of which are hereby incorporated by reference.

REFERENCE TO GOVERNMENT RIGHTS

This invention was made with government support under DE-SC0008707 awarded by the US Department of Energy. The government has certain rights in the invention.

BACKGROUND

Photoelectrochemical cells (PECs) can directly utilize photogenerated electron-hole pairs in semiconductor electrodes for fuel production as nature does through photosynthesis. In a typical PEC, fuels are formed by reduction reactions at the cathode which consume photoexcited electrons. Examples include the reduction of water to $H_2$ and the reduction of $CO_2$ to carbon-based fuels such as methanol and methane. In order to complete the circuit, oxidation reactions occur at the anode, consuming photogenerated holes. Typically, water oxidation to $O_2$ is used as the anode reaction, which is environmentally benign and does not require additional species in the electrolyte. Another critical role of water oxidation as the anode reaction for a sustainable PEC operation is the generation of $H^+$ ($2H_2O \rightarrow O_2 + 4H^+$) to offset the $H^+$ consumption accompanied by the cathode reaction reducing water or $CO_2$. However, water oxidation is not a kinetically favored reaction, and its product, $O_2$, is not of significant value. Therefore, identifying an anode reaction that has more favorable kinetics and can generate value added chemicals would be beneficial for increasing the overall efficiency and utility of PECs.

The production of building block chemicals as well as fuels using renewable energy sources is critical in order to be completely independent from fossil fuels. To achieve this goal, as well as to address the aforementioned issues, oxidatively producing building block organic molecules using biomass-derived intermediates as alternative anode reactions of PECs is an exciting and desirable strategy. Among the various biomass resources and intermediates, 5-hydroxymethylfurfural (HMF) derived from C6 monosaccharides, which are obtained by depolymerization of cellulosic biomasses, is considered a key platform molecule that can generate various industrially important molecules via further conversion. For example, one of its oxidation products, 2,5-furandicarboxylic acid (FDCA), can serve as a monomer to produce important polymeric materials such as polyethylene terephthalate and poly(ethylene 2,5-furandicarboxylate) and is considered a possible replacement for terephthalic acid. Another oxidation product of HMF, 2,5-diformylfuran (DFF), has the typical chemical properties of an aldehyde. Its applications include use in the synthesis of pharmaceuticals, antifungal agents, macrocyclic ligands, and organic conductors, as an intermediate and monomer for the synthesis of polymers and as a key building block for porous organic frameworks.

Most previous studies of the conversion of HMF to FDCA utilized aerobic oxidation using heterogeneous catalysts. Typically, the reaction is performed in an alkaline aqueous solution (pH≥13) under high pressure $O_2$ or air (3-20 bar), usually at elevated temperatures (30-130° C.) using precious metals (e.g. Au, Pd, and Pt or their bimetallic alloys) as catalysts. An alternative approach to aerobic oxidation is electrochemical oxidation where the oxidation is driven by the electrochemical potential applied to the electrode, which eliminates the use of $O_2$ or other chemical oxidants. Electrochemical oxidation can also offer the advantage of controlling the oxidation potential and monitoring the reaction rate by the current, which may provide additional mechanistic insights. However, only a few reports have been published for electrochemical oxidation of HMF to FDCA to date. A study by Strasser and co-workers probed the feasibility of electrochemical oxidation of HMF using a Pt electrode in a pH 10 aqueous solution and found that a fraction of HMF could be converted to 2,5-diformylfuran (DFF) but conversion of HMF to FDCA was negligible. They noted that water oxidation was the major competing reaction and likely limited the Faradaic efficiency (FE) for HMF oxidation. A more recent study by Li and co-workers reported the use of carbon black supported precious metal nanoparticles (Au/C, Pd/C $Pd_2Au/C$, $PdAu_2/C$) and demonstrated that the use of $PdAu_2$ alloy nanoparticles significantly enhanced the conversion of HMF to FDCA (83% yield). However, FDCA was obtained with other oxidation intermediates such as 5-hydroxymethyl-2-furan-carboxylic acid (HMFCA) and complete conversion to FDCA was not reported in their study.

SUMMARY

Electrochemical cells and photoelectrochemical cells for the oxidation of HMF to FDCA and/or DFF are provided. Also provided are methods of using the cells to carry out the oxidation reactions.

The methods for the TEMPO-mediated electrochemical oxidation of 5-hydroxymethylfurfural are carried out in electrochemical cells comprising: an anode in an anode electrolyte solution comprising 5-hydroxymethylfurfural; a TEMPO mediator immobilized on the anode or dissolved in the anode electrolyte solution; and a cathode in a cathode electrolyte solution, wherein the cathode is in electrical communication with the anode. The methods comprise the steps of: applying an anode potential to the anode, the anode potential being more positive than the onset potential for the oxidation of the TEMPO mediator, to induce the TEMPO-mediated oxidation of the 5-hydroxymethylfurfural to form 2,5-furandicarboxylic acid, 2,5-diformylfuran or both.

The methods for the photoelectrochemical oxidation of 5-hydroxymethylfurfural are carried out in photoelectrochemical cells comprising: an anode in an anode electrolyte solution comprising 5-hydroxymethylfurfural; and a cathode in a cathode electrolyte solution, wherein at least one of the anode and the cathode is a photoelectrode comprising a semiconductor. Optionally, a TEMPO mediator can be included in the anode electrolyte solution or immobilized on the anode in order to mediate the photoelectrochemical oxidation. The methods comprises the steps of: exposing the at least one photoelectrode to radiation that is absorbed to produce electron-hole pairs, wherein holes are transported to the electrolyte-anode interface where they induce the oxidation of the 5-hydroxymethylfurfural to form 2,5-furandicarboxylic acid, 2,5-diformylfuran or both, and electrons are transported to the electrolyte-cathode interface where they induce a reduction reaction.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Electrochemical cells (EC) and photoelectrochemical cells (PEC) for the oxidation of HMF to FDCA and/or DFF are provided. Also provided are methods of using the cells to carry out the oxidation reactions.

The cells and methods are able to substantially completely convert HMF, a common biomass-derived intermediate, into organic building block molecules that are useful in the production of a variety of chemicals. Moreover, the oxidations can be conducted at ambient temperatures and pressures (e.g., about 23° C. and about 1 atm) and do not require the use of precious metal catalyst electrodes. When the oxidation is used as the anode reaction in a PEC, it can replace the oxidation of water to oxygen, which is generally considered a low value product. This increases both the efficiency and utility of the PECs for solar fuel production.

Figure 4A:
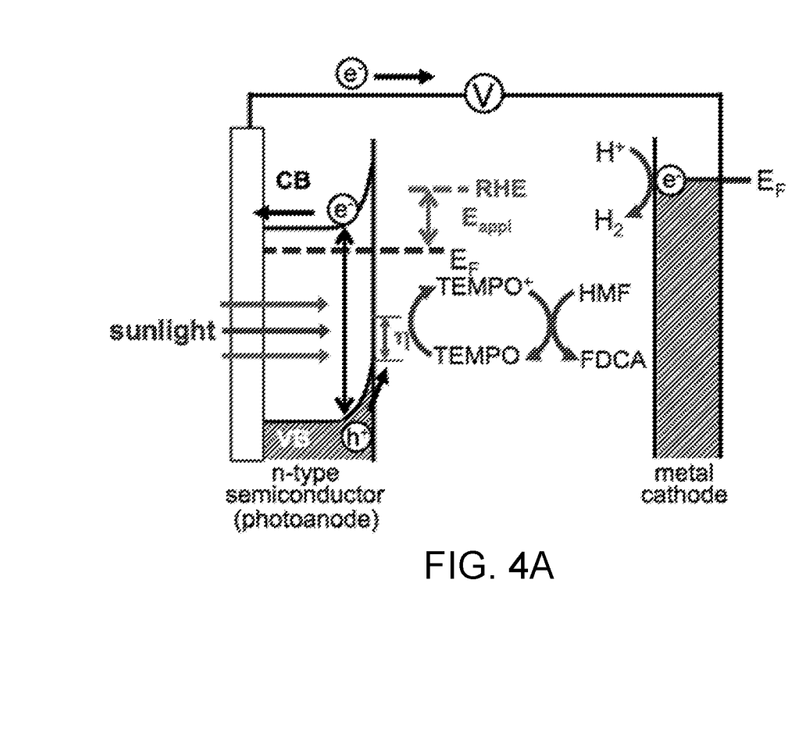
FIG. 4A. Photoelectrochemical TEMPO-mediated HMF oxidation. ($E_{appl}$: applied bias, η:overpotential available for TEMPO oxidation)
Figure 4B:
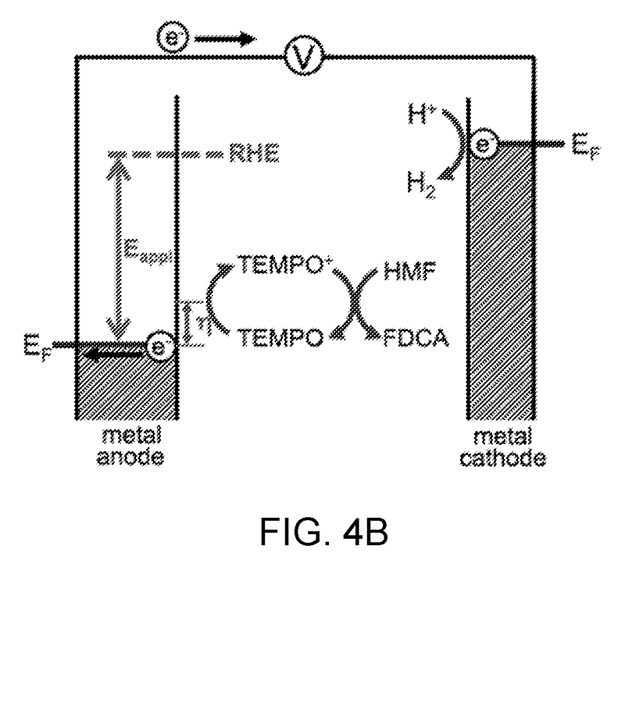
FIG. 4B. Electrochemical TEMPO-mediated HMF oxidation. ($E_{appl}$: applied bias, η:overpotential available for TEMPO oxidation)

One embodiment of an electrochemical cell comprises an anode in an electrolyte solution comprising a solvent and HMF. The cell also includes a TEMPO mediator, which may be dissolved in the anode electrolyte solution or immobilized on the anode. A cell cathode in a cathode electrolyte solution is in electrical communication with the anode. The electrolyte solvents in the anode and cathode electrolyte solutions can be the same or different and the electrolyte solutions can be aqueous or non-aqueous. The operation of the EC is illustrated in FIG. 4B and described in detail in the examples. A more general description of electrochemical oxidation of HMF in an aqueous electrolyte solution is provided here. To operate the EC, a voltage source is used to apply an anode potential to the anode and a potential difference is created between the anode and the cathode. Driven by this potential difference, electrons flow from the anode to the cathode through an external wire. The electrons at the surface of the cathode undergo reduction reactions with species contained in the cathode electrolyte solution, while oxidation reactions occur at the anode. In a TEMPO-mediated oxidation, the TEMPO acts as an HMF oxidation mediator. That is, the TEMPO mediator promotes the oxidation of HMF by oxidizing at the anode to form the oxoammonium cation ($TEMPO^+$), which is subsequently consumed by HMF oxidation. By using an anode potential that is between the onset potential of the TEMPO mediator and the onset potential for the oxidation of water to hydrogen, the competing water oxidation reaction can be significantly reduced, and even substantially eliminated, to provide an extremely high and selective HMF oxidation product yield.

Figure 1:
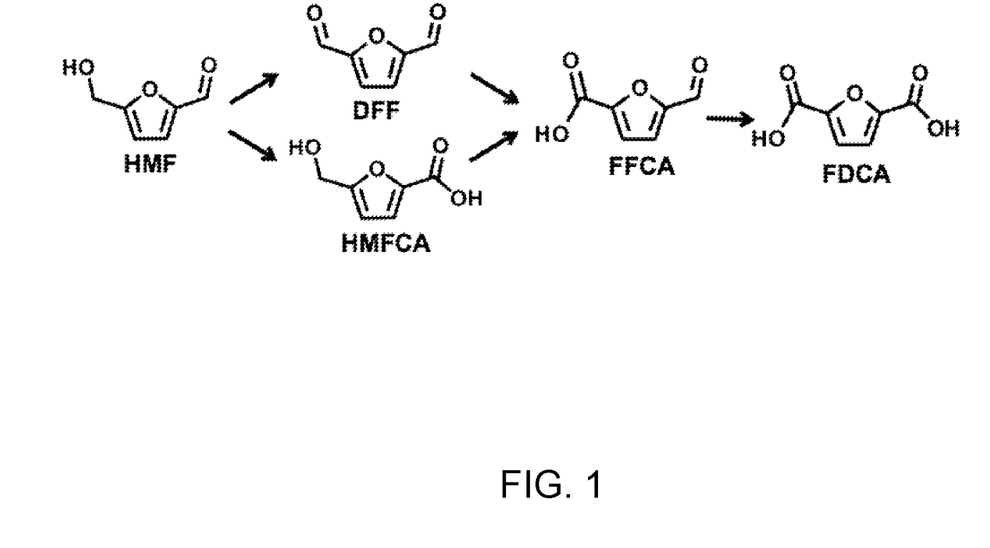
FIG. 1. Two possible pathways of HMF oxidation to FDCA.

If the anode reaction is carried out in an aqueous electrolyte solution, the oxidized HMF can go on to form FDCA at a high yield. Two pathways have been identified for the production of FDCA from HMF. Both pathways are shown in FIG. 1. In one pathway, the oxidized HMF gives rise to 2,5-diformylfuran (DFF) as and intermediate, while in the other 5-hydroxymethyl-2-furan-carboxylic acid (HMFCA) is formed as an intermediate. In the present cells and methods, the use of a TEMPO mediator results in the formation of DFF as the dominant intermediate in the production of FDCA. Therefore, if the anode reaction is carried out in an electrolyte solution that does not serve as an oxygen donor, such as acetonitrile, the oxidation reaction can be arrested at the DFF intermediate to provide DFF as a product in high yields.

The anode in the EC may comprise catalytic precious metals or alloys of catalytic precious metals. For example, the anode may comprise Au, Pt, Pd or alloys thereof. However, because the TEMPO mediators act as oxidation mediators and catalysts, the anode need not comprise a precious metal, such as Au, Pt, or PD, if a TEMPO mediator is present. This makes is possible to use less expensive, non-precious metal electrode materials, such as carbon, conducting polymers and metal oxides.

One embodiment of a photoelectrochemical cell comprises an anode in an anode electrolyte solution comprising HMF in an anode solvent. A TEMPO mediator may optionally be included in the cell. The TEMPO mediator can be dissolved in the anode electrolyte solution or immobilized on that anode. A cell cathode in a cathode electrolyte solution is in electrical communication with the anode. At least one of the anode and the cathode is a photoelectrode comprising an n-type or p-type semiconductor, respectively. The operation of the PEC is illustrated in FIG. 4A and described in detail in the examples. In this PEC, the anode is a photoanode. To operate the PEC, the photoanode comprising a semiconductor material is irradiated with electromagnetic radiation to create electron-hole pairs, which are separated in the photoanode. The electrons are then driven through an external wire from the photoanode to the cathode. A potential may be applied to the photoanode to help drive the PEC reactions. Electrons reaching the surface of the cathode undergo reduction reactions with species contained in the cathode electrolyte solution, while oxidation reactions occur at the surface the photoanode. An advantage of the PEC is that, by using solar radiation to drive the oxidation reaction, the cell operation becomes more efficient from an energy usage standpoint. As in the EC, a TEMPO mediator can be used to promote the oxidation of HMF to form FDCA through a DFF intermediate and an anode electrolyte solution that does not serve as an oxygen donor can be used to arrest the oxidation to form DFF in a high yield.

The photoanode in the PEC may be composed of a variety of n-type semiconductors. In some embodiments of the PECs, the photoanode comprises n-type $BiVO_4$ and, in particular, nanoporous $BiVO_4$. Methods of fabricating an n-type $BiVO_4$ photoanode are described in Kim, T. W. & Choi, K.-S. Nanoporous $BiVO_4$ Photoanodes with Dual-Layer Oxygen Evolution Catalysts for Solar Water Splitting. *Science* 343, 990-994 (2014). In the present PECs, however, the $BiVO_4$ photoanodes should be used without the oxygen evolution catalysts described in Kim et al. because TEMPO oxidation can be enhanced and water oxidation suppressed by the $BiVO_4$ surface, which is a poor catalyst for water oxidation. Although the cathode in the PEC of FIG. 4A is not a photocathode, a photocathode comprising a p-type semiconductor can be used instead of, or in addition to, a photoanode. If a TEMPO mediator is not present in the PEC, the anode comprises a material that is catalytic for HMF oxidation. For example, the anode may comprise an n-type semiconductor, such as $BiVO_4$, coated with a solid catalyst for HMF oxidation.

In FIGS. 4A and 4B, the cathode reaction is illustrated by the reduction of water to Hz. However, other cathode reactions are possible, including the reduction of carbon dioxide to form carbon based fuels, such as methanol or methane.

Notably, the present electrochemical and photoelectrochemical oxidations of HMF can be carried out in electrolyte solutions at relatively low pH, compared to previous HMF oxidations, and still provide a high product yield. For example, using the present cells and methods, HMF can undergo oxidation at a pH of 12 or lower. This includes embodiments of the cells and methods in which HMF is oxidized at a pH of 10 or lower and further includes embodiments in which HMF is oxidized at a pH of 9 or lower. The use of lower pH solutions is advantageous because HMF is more stable under these conditions. The electrolyte solutions may include a buffer, such as borate, to maintain a given pH.

The TEMPO mediator may be 2,2,6,6-tetramethylpiperidine 1-oxyl (TEMPO) or a TEMPO derivative, where the derivatives retain the nitroxyl radical group but have different ring substituents. Appropriate TEMPO derivatives can be selected based on their solubilities in a given electrolyte solution. Examples of TEMPO derivatives include, but are not limited to, 4-methoxy-2,2,6,6-tetramethylpiperidine-1-oxyl (4-MeO-TEMPO), 4-hydroxy-2,2,6,6-tetramethylpiperidine-1-oxyl (4-HO-TEMPO) and 4-acetamido-2,2,6,6-tetramethylpiperidine-1-oxyl (4-AcNH-TEMPO).

The electrochemical and photoelectrochemical oxidation of HMF can be carried out substantially completely to provide products at a high yield with high selectivity. For example, HMF can be converted into DFF and/or FDCA with an HMF conversion of at least 90% and a product yield of at least 90%. This includes embodiments of the cells and methods that provide a yield of FDCA or DFF at least 94% and further includes cells and methods that provide a yield of FDCA of at least 99%. Methods for quantifying conversions and yields are described in the examples that follow.

EXAMPLES

Example 1

Electrochemical and Photoelectrochemical Oxidation of HMF to FDCA Using a TEMPO Mediator This example demonstrates that electrochemical oxidation of HMF to FDCA using 2,2,6,6-tetramethylpiperidine 1-oxyl (TEMPO) as a mediator and catalyst can be achieved with nearly 100% yield and Faradaic efficiency at ambient pressure and temperature. It further demonstrates the construction of a PEC that utilizes solar energy for HMF oxidation as the anode reaction. In this PEC, n-type $BiVO_4$ was used as a photoanode to generate and separate electron-hole pairs. The photoexcited electrons were transferred to the Pt cathode for $H_2$ production while photogenerated holes were used at the $BiVO_4$ surface for HMF oxidation. The feasibility, advantage, and efficiency of TEMPO-mediated electrochemical and photoelectrochemical oxidation of HMF and its viability as the PEC anode reaction are discussed below.

Results and Discussion

Figure 2A:
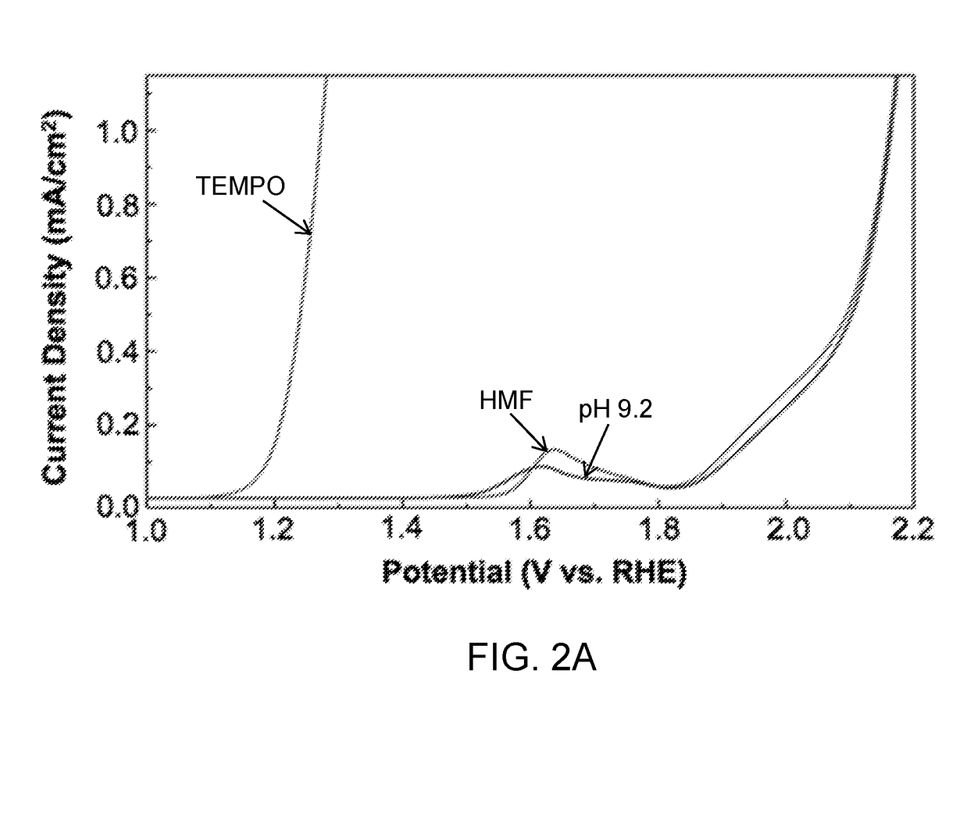
FIG. 2A. Linear Sweep Voltametry curves (LSVs) of a Au electrode obtained in a 0.5 M borate buffer solution (pH 9.2), a 0.5 M borate buffer solution containing 5 mM HMF, and a 0.5 M borate buffer solution containing 5 mM HMF and 7.5 mM TEMPO (scan rate, 10 mV/s).

Electrochemical oxidation. For electrochemical oxidation of HMF in an aqueous medium, water oxidation can be the major competing reaction. Therefore, electrochemical oxidation of water, HMF, and TEMPO was first investigated using an Au working electrode in a 0.5 M borate buffer solution (pH 9.2) by linear sweep voltammetry (LSV) (FIG. 2A). The LSV obtained without HMF and TEMPO shows an anodic current onset at 1.83 V vs. RHE, which was due to water oxidation to $O_2$. A small oxidation peak around 1.6 V vs. RHE was due to the surface oxidation of the Au electrode. When 5 mM HMF was added, no significant change in the current profile was observed, suggesting that the oxidation of HMF on the Au surface was not particularly favored over water oxidation. When a constant potential electrolysis was performed at 2.05 V vs. RHE using this solution, only a negligible fraction of HMF (<1%) was converted to DFF, suggesting that the majority of anodic current generated was associated with water oxidation.

Figure 2B:
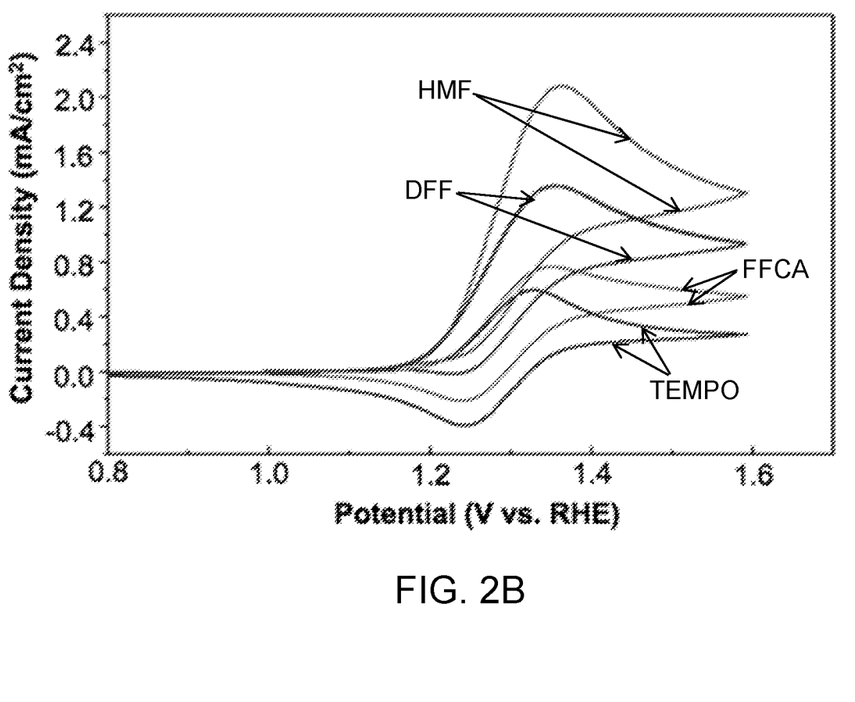
FIG. 2B. Cyclic Voltametry curves (CVs) obtained in a 0.5 M borate buffer solution containing 7.5 mM TEMPO and the same solution containing 5 mM HMF, DFF, or FFCA.

When 7.5 mM of TEMPO was added, the anodic current onset was shifted to 1.09 V vs. RHE, indicating that the oxidation of TEMPO was significantly easier than that of water or HMF. Whether the oxidized TEMPO (i.e. the oxoammonium cation, denoted as $TEMPO^+$ in this study) can serve as a mediator and catalyst for HMF oxidation was examined by recording cyclic voltammetry (CV) of TEMPO with and without HMF. The CV of TEMPO measured in a 0.5 M borate buffer solution without HMF is shown in FIG.

2B, which displays almost symmetric anodic and cathodic current peaks due to the oxidation of TEMPO and the reduction of TEMPO$^+$, respectively. When a CV was measured after 5.0 mM HMF was added, an increase in anodic current with a concomitant decrease in cathodic current was observed. The enhancement of anodic current is due to regeneration of TEMPO in the vicinity of the electrode surface due to the reaction between TEMPO$^+$ and HMF, oxidizing HMF. Since TEMPO$^+$ was consumed by HMF oxidation in solution, the cathodic peak due to the TEMPO$^+$ reduction at the electrode surface was decreased accordingly. This result shows that although HMF oxidation occurs at a significantly more positive potential than TEMPO oxidation, it is due to the extremely poor kinetics of heterogeneous oxidation of HMF on the Au electrode, and, in fact, HMF oxidation is thermodynamically more favorable than TEMPO oxidation. This means that by using TEMPO as a mediator and catalyst and by choosing an oxidation potential between the onset potentials of TEMPO oxidation and water oxidation, HMF oxidation can be achieved with a significantly decreased overpotential without competing with water oxidation.

Figure 2C:
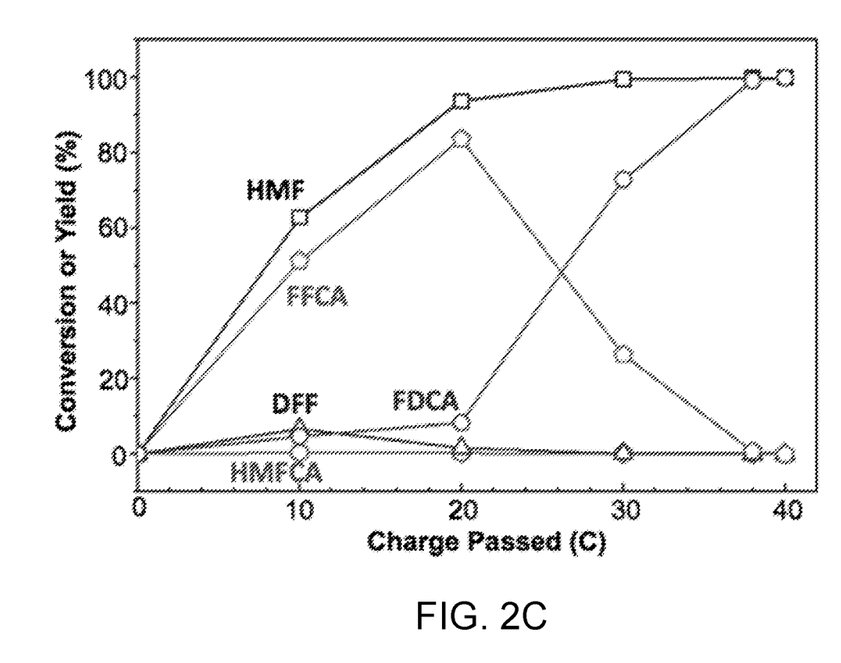
FIG. 2C. Conversion and yield (%) changes of HMF and its oxidation products during electrochemical oxidation of HMF at 1.54 V vs. Reversible Hydrogen Electrode (RHE) in a 0.5 M borate buffer solution containing 5 mM HMF and 7.5 mM TEMPO.

In order to examine the oxidation products and their yields, TEMPO-mediated HMF oxidation was carried out by applying a constant potential of 1.54 V vs. RHE (=0.80 V vs. Ag/AgCl) and passing 40 C. Since water oxidation cannot occur at this potential (FIG. 2A), a high Faradic efficiency (FE) for HMF oxidation was expected. Concentration changes of HMF and its oxidation products were monitored during HMF oxidation by analyzing the electrolyte using high-performance liquid chromatography (HPLC). The HMF conversion (%) and the yields (%) of oxidation products were calculated using equations (1-2), which are displayed in FIG. 2C.

$$\text{HMF conversion (\%)} = \frac{\text{mol of } HMF \text{ consumed}}{\text{mol of initial } HMF} \times 100 \quad (1)$$

$$\text{Yield of product (\%)} = \frac{\text{mol of product formed}}{\text{mol of initial } HMF} \times 100 \quad (2)$$

The result showed the complete conversion of HMF to FDCA when 40 C was passed (HMF conversion >99%, Yield of FDCA>99%). Oxidation of HMF is known to occur through two different pathways. One is through initial aldehyde oxidation, forming HMFCA as the intermediate, and the other is through initial alcohol oxidation, forming DFF as the intermediate (FIG. 1). In most aerobic oxidation reactions, a pathway through HMFCA was dominantly observed. However, the present results showed that TEMPO-mediated HMF oxidation occurred through the formation of DFF. Judging from the fact that the concentration of DFF remained low throughout the conversion process, the conversion rate of DFF to 2-formyl-5-furancarboxylic acid (FFCA) is comparable to the formation rate of DFF. Once FFCA is formed, it was accumulated until the majority of the HMF and DFF were consumed, suggesting that the oxidation of FFCA by TEMPO$^+$ to FDCA is rate limiting for the TEMPO-mediated oxidation of HMF to FDCA.

The oxidation kinetics of HMF, DFF, and FFCA by TEMPO$^+$ could be easily compared by CVs of TEMPO in solution with HMF, DFF, and FFCA. Since the oxidation rate of these species by TEMPO$^+$ is equivalent to the regeneration rate of TEMPO, the species with the fastest oxidation kinetics will cause the most significant enhancement in anodic current for TEMPO oxidation and also the most significant decrease in cathodic current for TEMPO$^+$ reduction. The CV comparison in FIG. 2B shows that the oxidation of HMF by TEMPO$^+$ is the fastest, and that of FFCA is the slowest, which agrees well with the yield profiles of DFF, FFCA, and FDCA shown in FIG. 2C.

The FE for FDCA formation, which requires 6 electron oxidation (HMF+6OH$^-$→FDCA+4H$_2$O+6e$^-$), were calculated using equation (3), where F is the Faraday constant (96485 C/mol). The FE corresponding to the TEMPO-mediated FDCA formation shown in FIG. 2C at 40 C was calculated to be 94%. The high yield and FE for the FDCA formation, which was achieved at ambient temperature and pressure in a mildly basic aqueous solution without consuming chemical oxidants or generating chemical waste, suggest that TEMPO-mediated electrochemical oxidation can be one of the most efficient, practical, and environmentally benign routes for the conversion of HMF to FDCA. After electrolysis, the electrolyte can be acidified (pH<3) to isolate FDCA as precipitates. This process did not affect the electrochemical activity of TEMPO for further use.

$$FE(\%) = \frac{\text{mol of } FDCA \text{ formed}}{\text{Total charge passed}/(F \times 6)} \times 100 \quad (3)$$

Photoelectrochemical Oxidation Using a PEC. Based on these exciting results, a PEC using HMF oxidation as the anode reaction was constructed. In this cell, an n-type nanoporous BiVO$_4$ electrode was used as a photoanode that absorbs photons to generate and separate electron-hole pairs. After separation, electrons are transferred to the Pt counter electrode to reduce water to H$_2$ while the holes reaching the surface of BiVO$_4$ are used for TEMPO-mediated HMF oxidation (equations 4-5). A 0.5 M borate buffer solution (pH 9.2) was used as the electrolyte with 7.5 mM TEMPO and 5.0 mM HMF added only to the anolyte, which was separated from the catholyte by fritted glass. The overall reaction achieved by this PEC is shown in equation (6). Equations (4-6) show that, like water oxidation, HMF oxidation can offset the pH change at the cathode.

Cathode Reaction: 6H$_2$O+6e$^-$→3H$_2$+6OH$^-$      (4)

Anode Reaction: HMF+6OH$^-$→FDCA+4H$_2$O+6e$^-$      (5)

Overall: HMF+2H$_2$O→FDCA+3H$_2$      (6)

The nanoporous BiVO$_4$ electrode used in this study was prepared using a method reported in a recent paper where it was used as a photoanode for a water splitting photoelectrochemical cell and demonstrated the highest applied bias photon-to-current efficiency among oxide-based photoelectrodes reported to date. For the goal of solar water splitting, the BiVO$_4$ electrode was coated with oxygen evolution catalysts (OEC) because the bare surface of BiVO$_4$ is poorly catalytic for water oxidation. However, the poorly catalytic surface of BiVO$_4$ for water oxidation is advantageous for maximizing TEMPO oxidation while suppressing water oxidation. Therefore, a bare BiVO$_4$ electrode without OEC layers was used as the photoanode for the PEC constructed in this study.

Figure 3A:
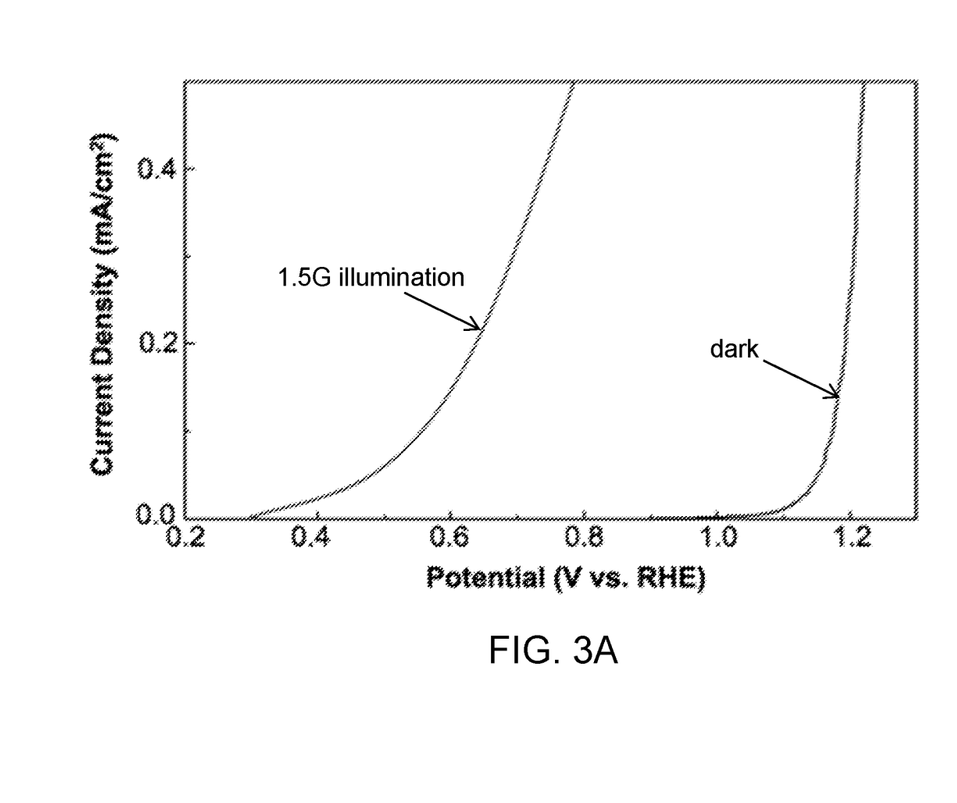
FIG. 3A. LSVs of a $BiVO_4$ photoanode obtained under AM 1.5 G illumination (100 $mW/cm^2$) and a Au electrode in dark in a 0.5 M borate buffer solution (pH 9.2) containing 5 mM HMF and 7.5 mM TEMPO (scan rate, 10 mV/s).

LSV for TEMPO oxidation by BiVO$_4$ was recorded under AM 1.5G (100 mW/cm$^2$) illumination and was compared with the LSV of a Au electrode for TEMPO oxidation obtained in the dark (FIG. 3A), which clearly demonstrated the advantage of using solar energy for TEMPO oxidation. The electrochemical onset potential for TEMPO oxidation by the Au electrode is 1.01 V vs. RHE, but the onset potential for photooxidation of TEMPO by $BiVO_4$ is shifted to 0.32 V vs. RHE, showing a reduction of the potential necessary to initiate HMF oxidation by ~700 mV. This is because the valence band (VB) edge of $BiVO_4$ is located at ~2.4 V vs. RHE and, therefore, photogenerated holes in the VB of $BiVO_4$ already possess sufficient overpotential for TEMPO oxidation before applying any external bias (FIG. 4A). It is worthwhile to note that the role of the applied bias for anodic photocurrent generation is not to change the overpotential for the oxidation reaction, which is determined by the VB edge position that is independent of the applied bias. Instead, it is to enhance electron-hole separation, which makes more holes available at the semiconductor surface for oxidation reactions. Therefore, ideally, the photocurrent onset potential for TEMPO oxidation can be lowered to the flatband potential of $BiVO_4$, which is ca. 0.1 V vs. RHE. This is quite different from electrochemical HMF oxidation by a metal electrode (e.g. Au) where the applied potential directly affects the overpotential available for oxidation reaction (FIG. 4B).

Figure 3B:
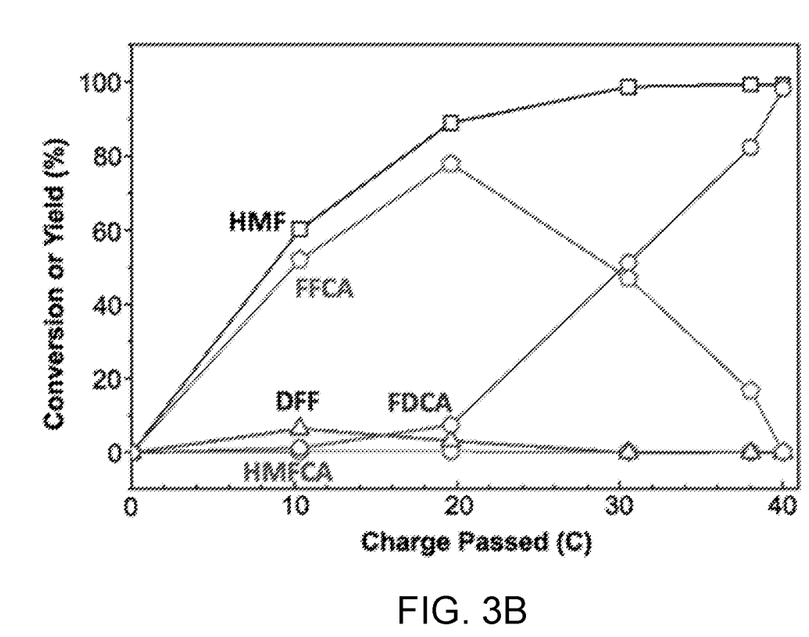
FIG. 3B. Conversion and yield (%) changes of HMF and its oxidation products during TEMPO-mediated photooxidation of HMF at 1.04 V vs. RHE in a 0.5 M borate buffer solution containing 5 mM HMF and 7.5 mM TEMPO under AM 1.5G illumination (100 $mW/cm^2$).

TEMPO-mediated photooxidation of HMF was carried out at 1.04 V vs. RHE (=0.3 V vs. Ag/AgCl) to analyze the oxidation products, yields, and FE. It should be noted that this potential is not sufficient to initiate electrochemical oxidation of TEMPO on the Au electrode (FIG. 2A). The conversion (%) of HMF and yields (%) of oxidation products (FIG. 3B) look similar to those shown in FIG. 2C, which is expected because the oxidation kinetics of HMF by $TEMPO^+$ should be identical whether $TEMPO^+$ was produced electrochemically or photoelectrochemically. The final yield of FDCA at 40 C was >99%. For this experiment, 1.04 V vs. RHE was chosen for the practical purpose of shortening the experiment time. However, a lower applied potential, such as 0.6 V vs. RHE, can be used.

Since the VB position of $BiVO_4$ is 2.4 V vs. RHE, the photogenerated holes at the VB of $BiVO_4$ also have sufficient overpotential for water oxidation. Therefore, it is possible that some of the photogenerated holes were used for water oxidation, lowering the FE for FDCA formation. However, the FE for FDCA formation was calculated to be 93% at 40 C, suggesting that TEMPO oxidation is kinetically much faster than water oxidation and was the dominant oxidation reaction occurring on the bare $BiVO_4$ surface. These results show that TEMPO-mediated HMF oxidation is kinetically, as well as thermodynamically, more favorable than water oxidation as the anode reaction for a photoelectrochemical cell. This means that when an electrochemical cell or a PEC is constructed for the goal of water reduction (or $CO_2$ reduction) and TEMPO oxidation replaces water oxidation, FDCA can be obtained in high yield and efficiency while, in essence, no additional resources or costs are invested specifically for HMF oxidation.

Electrochemical oxidation using a carbon felt electrode. Typically, precious metals are used as catalytic electrodes because they are necessary to ensure favorable electrode-HMF interaction for direct HMF oxidation. However, when TEMPO is used as a mediator, direct electrode-HMF interaction is no longer necessary, and, therefore, the need for precious metal electrodes may disappear if TEMPO oxidation can be achieved efficiently on inexpensive non-precious metal electrodes. In order to probe this possibility, TEMPO-mediated HMF oxidation was performed using carbon felt as the working electrode, which can also inherently offer high surface areas and may make electrochemical HMF oxidation more efficient and practical.

Figure 5A:
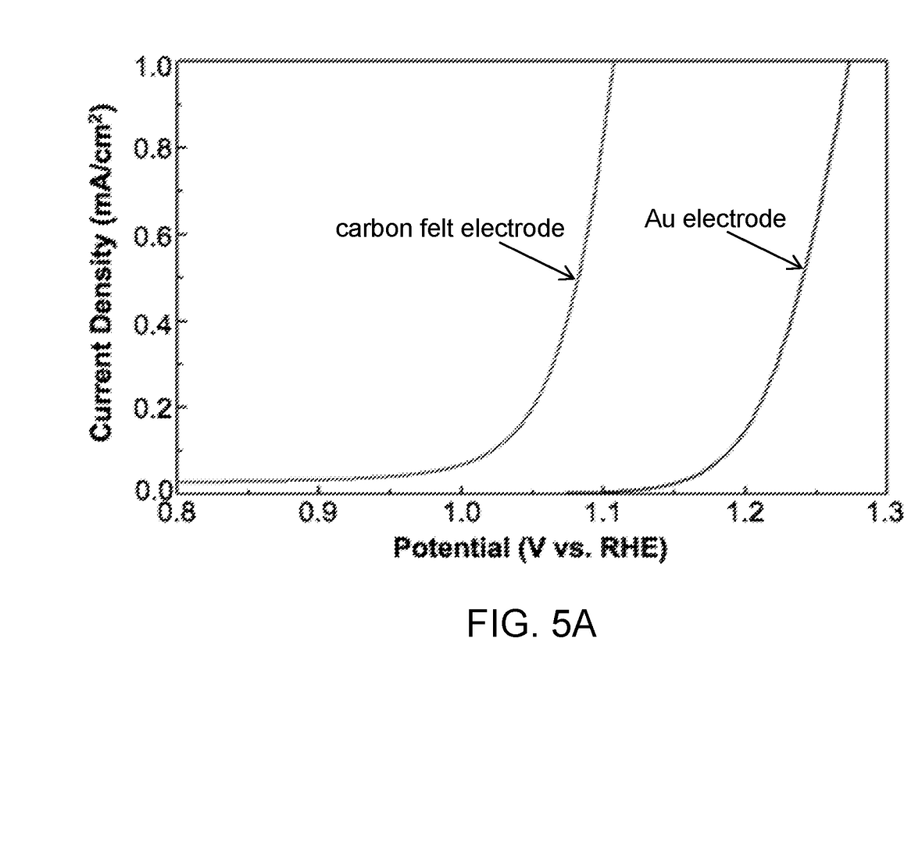
FIG. 5A. LSVs of a carbon felt electrode and an Au electrode in a 0.5 M borate buffer solution containing 5 mM HMF and 7.5 mM TEMPO (scan rate, 10 mV/s).
Figure 5B:
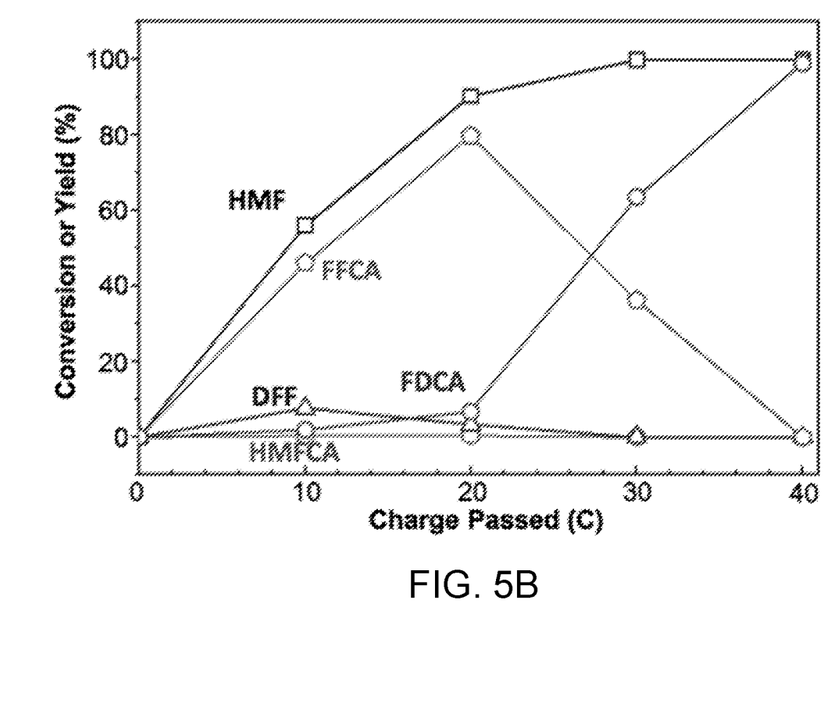
FIG. 5B. Conversion and yield (%) changes of HMF and its oxidation products during TEMPO-mediated oxidation of HMF at 1.54 V vs. RHE in a 0.5 M borate buffer solution containing 5 mM HMF and 7.5 mM TEMPO under AM 1.5G illumination (100 $mW/cm^2$).

LSVs of carbon felt and Au electrodes for TEMPO oxidation are compared in FIG. 5A. The results show that the overpotential required to generate a current density of 1 $mA/cm^2$ was reduced by 170 mV when the Au working electrode was replaced by the carbon felt working electrode. This confirms that TEMPO oxidation can be achieved by inexpensive carbon felt electrodes efficiently and the high surface area of carbon felt electrode increased the current density generated per unit geometric area of the electrode. As a result, when TEMPO-mediated HMF oxidation was performed at a constant potential of 1.54 V vs. RHE (=0.8 V vs. Ag/AgCl) using a carbon felt electrode instead of a Au electrode, comparable yield (99%) and FE (93%) were obtained for the production of FDCA but the time required for the complete conversion was shortened from 4 h 23 min to 1 h 11 min. The conversion and yield profiles of HMF and its oxidation products during electrochemical oxidation of HMF is shown in FIG. 5B, which is comparable to the results shown in FIG. 2C.

It should be noted that the time required for the complete conversion is inversely proportional to the area of the electrode. In this study, the geometric area of the electrode was limited to 1 $cm^2$ due to the size of the divided cells used for experiments. However, the size of the electrode can be easily increased to shorten the conversion time when the cell is scaled up for practical use. Therefore, not the absolute conversion time but the selectivity and FE for the formation of FDCA, which do not depend on the electrode size, should be the critical factors to consider when evaluating the viability or practicality of electrochemical and photoelectrochemical HMF oxidation. Both electrochemical and photoelectrochemical oxidation of HMF demonstrated in this study resulted in the formation of FDCA as the only final product (100% selectivity) with 93-94% FE at ambient conditions.

In summary, this example has demonstrated highly efficient electrochemical oxidation of HMF to FDCA using TEMPO as a mediator (yield ≥ 99%, FE ≥ 93%) in a pH 9.2 aqueous medium. By using TEMPO as a mediator, the amount of overpotential necessary to initiate HMF oxidation was reduced significantly and the need for precious metal catalyst electrodes was eliminated. A photoelectrochemical cell that used TEMPO-mediated photoelectrochemical oxidation of HMF as the anode reaction was constructed. By using photogenerated holes in the VB of $BiVO_4$ for oxidation, the applied bias necessary to initiate TEMPO oxidation could be reduced considerably. The high FE achieved for FDCA formation indicated that TEMPO oxidation was kinetically much more favorable than water oxidation. These results confirm that TEMPO-mediated oxidation of HMF can be a viable anode reaction for PECs that may increase not only the utility but also the efficiency of PECs constructed for solar fuel production. Using better photoelectrodes photooxidation of HMF and photoreduction of water will be possible with no external bias.

Experimental Methods

Materials. The following chemicals were used without further purification. 5-hydroxylmethylfufural (HMF, 99%), 5-hydroxymethyl-2-furancarboxylic acid (HMFCA), 2,5-dicarboxylic acid (FDCA, 97%), NaOH (99.9%), boric acid (≥99.5%), and 2,2,6,6-tetramethylpiperidine 1-oxyl (TEMPO, 98%) were purchased from Sigma-Aldrich. 2,5-diformylfuran (DFF, 97%) and 5-formyl-2-furancarboxylic acid (FFCA, >98.0%) were obtained from TCI America.

Deionized water (Barnstead E-pure water purification system, resistivity >18 MΩ cm) was used for preparing solutions.

Electrode preparation. Au electrodes used as working electrodes were prepared by sputter coating 20 nm of titanium as an adhesion layer followed by 100 nm of gold on clean glass slides. Platinum electrodes used as counter electrodes were prepared by depositing 20 nm of titanium as an adhesion layer followed by 100 nm of platinum on clean glass slides by sputter coating. Carbon felt used as working electrodes was purchased from Alfa Aesar. Nanoporous $BiVO_4$ electrodes used as photoanodes were prepared following the procedure reported in a recent study. The geometric surface areas of all working electrodes were 1 $cm^2$ and all current densities reported in this study were calculated using the geometric area of the working electrode.

Linear sweep voltammetry (LSV) and cyclic voltammetry (CV) in the Dark. LSVs and CVs were performed in an undivided glass cell with a three-electrode setup using a SP-200 potentiostat/EIS (BioLogic Science Instrument). Au or carbon felt electrodes were used as working electrodes with a Ag/AgCl (4 M KCl) reference electrode and a platinum counter electrode. A 0.5 M borate buffer solution (pH 9.2) was used as the electrolyte. When necessary 7.5 mM TEMPO, 5 mM HMF, 5 mM DFF, 5 mM FFCA, and/or 5 mM FDCA were added to the electrolyte, LSVs were conducted by sweeping the potential to the positive direction at room temperature without stirring with a scan rate of 10 mV/s. CVs were conducted using the same conditions with the potential sweep made to the positive direction first. Although the working electrode potential was measured against a Ag/AgCl (4 M KCl) reference electrode, all results in this work were presented against the reversible hydrogen electrode (RHE) for ease of comparison with $H_2O/O_2$ redox levels and other reports that used electrolytes with different pH conditions. The conversion between potentials vs. Ag/AgCl and vs. RHE is performed using equation (7).

$$E(vs. RHE) = E(vs. Ag/AgCl) + E_{Ag/AgCl} (reference) + 0.059 \times pH \quad (7)$$

($E_{Ag/AgCl}$ (reference)=0.1976 V vs. NHE at 25° C.)

LSVs of $BiVO_4$ under illumination. LSVs of $BiVO_4$ for photooxidation of 7.5 mM TEMPO were obtained using simulated solar illumination obtained by Oriel LCS-100 with an AM 1.5G filter. All other conditions (e.g., electrochemical setup, solutions, and measurement conditions) were same as above. Illumination was achieved through the FTO substrate that was used as the substrate to deposit $BiVO_4$ electrodes. The power density of the incident light was calibrated to 100 $mW/cm^2$ at the surface of the FTO substrate (before the light penetrates FTO) by using a thermopile detector (International Light) and a NREL certified reference cell (Photo Emission Tech., Inc.).

Quantitative oxidation product analysis. In order to analyze oxidation products quantitatively and calculate yields and Faradaic efficiencies (FEs), TEMPO-mediated HMF oxidation was performed while applying a constant potential and passing 40 C. For electrochemical oxidation using Au or carbon felt working electrodes, 0.8 V vs. Ag/AgCl (4 M KCl) (=1.54 V vs. RHE) was used whereas 0.3 V vs. Ag/AgCl (4 M KCl) (=1.04 V vs. RHE) was used for photoelectrochemical oxidation using $BiVO_4$ working electrodes.

The electrolyte was a 0.5 M borate buffer (pH 9.2) solution containing 7.5 mM TEMPO and 5 mM HMF. A three electrode-cell composed of a working electrode (Au, carbon felt or $BiVO_4$), a Pt counter electrode, and a Ag/AgCl (4M KCl) reference electrode was used in an H-shaped divided cell with fritted glass as the divider. For photooxidation on $BiVO_4$, light was illuminated using the same setup described above. The electrochemical and photoelectrochemical oxidation were carried out at room temperature while stirring.

During and after the reaction, 10 µL of solution was taken out from the cell and analyzed using high-performance liquid chromatography (HPLC) to calculate HMF conversion and yields of products using Shimadzu SCL-10A chromatograph with a UV-visible detector (Shimadzu SPD-10AV) set at 265 nm. 5 mM sulfuric acid was used as the mobile phase in isocratic mode. 1 h of equilibration was required before each first injection. The flow rate was 0.5 mL/min at 60° C. 10 µL of samples/standards were directly injected on a 300 mm×7.8 mm ICSep ICE-Coregel 87H3 column purchased from Transgenomic. The identification of the products and calculation of their concentration were determined from calibration curves by applying a standard solution of known concentration. The retention times for detected compounds were 23 min, 25.6 min, 30.7 min, 37 min and 46 min, for FDCA, HMFCA, FFCA, HMF and DFF, respectively.

Example 2

Electrochemical Oxidation of HMF to DFF Using a TEMPO Mediator

This example illustrates the electrochemical oxidation of HMF to DFF using acetonitrile, which does not serve as an oxygen donor, as the solvent in the electrolyte solution.

Materials.

The following chemicals were used without further purification. 5-hydroxylmethylfurfural (HMF, 99%), 2,2,6,6-tetramethylpiperidine 1-oxyl (TEMPO, 98%), 2,6-lutidine (98%), tetraethylammonium hexafluorophosphate (TBAH, 99%) and acetonitrile (HPLC, ≥99.9%) were purchased from Sigma-Aldrich. 2,5-diformylfuran (DFF, 97%) was obtained from TCI America.

Electrochemical cell construction.

A three electrode-cell composed of an Au working electrode (geometric surface area, 1 $cm^2$), a Pt counter electrode, and an $Ag/AgNO_3$ non-aqueous reference electrode was used in an H-shaped divided cell with fritted glass as the divider. The cell was controlled by an SP-200 potentiostat/EIS (BioLogic Science Instrument). Ferrocene/ferrocenium redox couple (Fc/Fc+=0.085 V in 0.01 M $Ag/AgNO_3$) was used as internal standard. The electrolyte contained 5 mM HMF, 25 mM TEMPO, 15 mM 2,6-lutidine as a base and 0.1 M TBAH as a supporting electrolyte in acetonitrile.

Quantitative oxidation product analysis.

The electrolysis was monitored by high-performance liquid chromatography (HPLC) to calculate HMF conversion and yields of the products using a Shimadzu SCL-10A chromatograph with a UV-visible detector (Shimadzu SPD-10AV) set at 265 nm. During and after the reaction, 10 µL of solution was taken out from the cell and analyzed. 5 mM sulfuric acid was used as a mobile phase in an isocratic mode. 1 h of equilibration was required before each first injection. The flow rate was 0.5 mL/min at 60° C. 10 µL of samples/standards were directly injected on a 300 mm×7.8 mm ICSep ICE-Coregel 87H3 column purchased from Transgenomic. The identification of the products and calculation of their concentrations were determined from calibration curves by applying a standard solution of known concentration prior to every HPLC run. The retention times for detected compounds were 37 min and 46 min for HMF and DFF, respectively.

Figure 6:
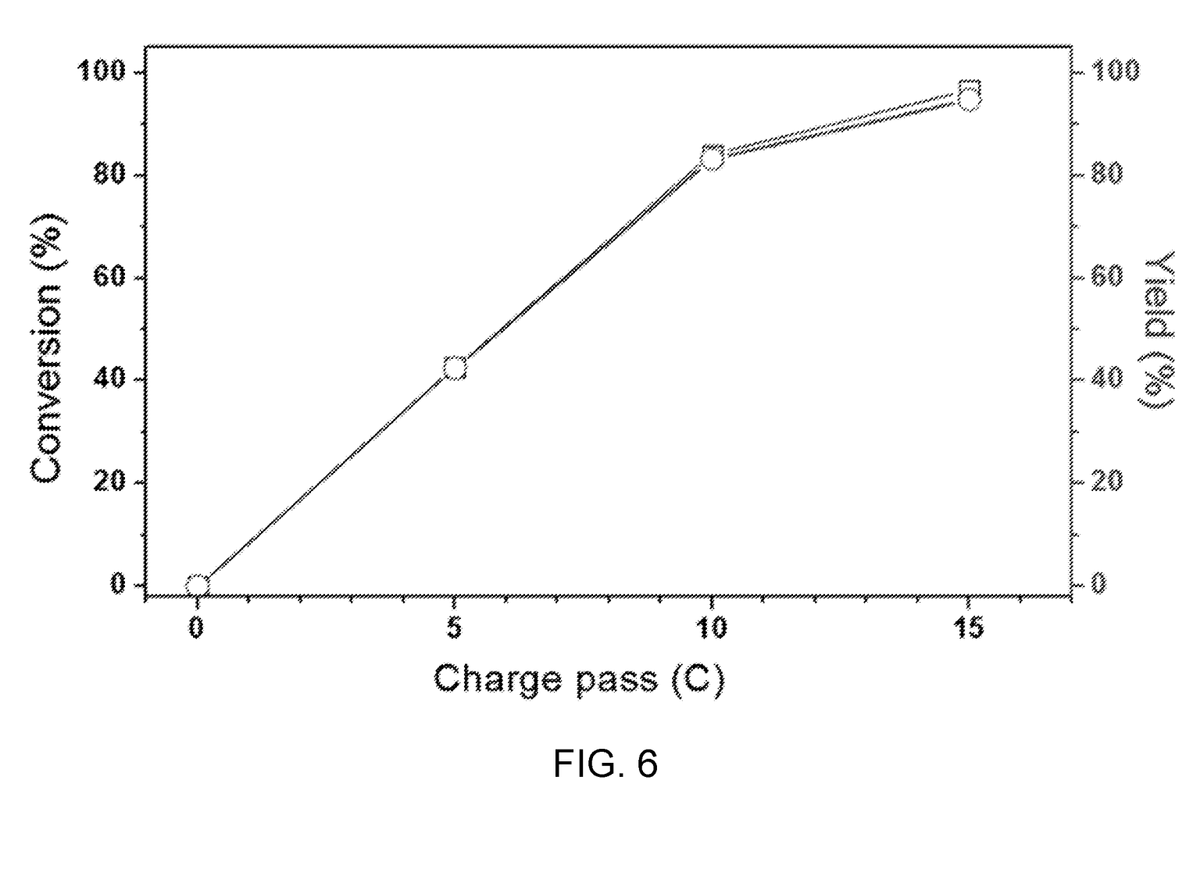
FIG. 6. Conversion and yield (%) changes of HMF and DFF during TEMPO-mediated electrochemical oxidation of HMF at 0.7 V vs. $Ag/AgNO_3$ in an acetonitrile solution containing 5 mM HMF, 25 mM TEMPO, 15 mM 2,6-lutidine as base, and 0.1 M TBAH.

The percent HMF conversion and the percent DFF yield during the electrochemical oxidation are shown in FIG. 6.

Results.

TEMPO-mediated electrochemical oxidation of HMF was achieved in acetonitrile media at 0.7 V vs. Ag/AgNO$_3$. No tendency for over-oxidation of aldehydes to acids was observed. HMF was oxidized at room temperature with 96.7% HMF conversion and 94.7% of DFF yield after 15 C passed.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A photoelectrochemical cell comprising:
   an anode in a single phase anode electrolyte solution comprising 5-hydroxymethylfurfural; and
   a cathode in a cathode electrolyte solution;
   wherein at least one of the anode and the cathode is a photoelectrode comprising a semiconductor.

2. The cell of claim 1, wherein the anode is a photoelectrode comprising a semiconductor.

3. The cell of claim 1, further comprising a TEMPO mediator immobilized on the anode or dissolved in the single-phase anode electrolyte solution.

4. The cell of claim 3, wherein the TEMPO mediator is immobilized on the anode.

5. The cell of claim 1, wherein the single-phase anode electrolyte solution is an aqueous electrolyte solution having a pH of less than 12.

6. The cell of claim 5, wherein the anode does not comprise platinum, palladium, or gold.

7. The cell of claim 1, wherein the single-phase anode electrolyte solution is an aqueous electrolyte solution having a pH of no greater than 10.

8. The photoelectrochemical cell of claim 1, wherein the anode is a photoanode comprising n-type BiVO$_4$.

9. A photoelectrochemical cell comprising:
   a photoanode comprising n-type BiVO$_4$ in an anode electrolyte solution comprising 5-hydroxymethylfurfural; and
   a cathode in a cathode electrolyte solution.

10. An electrochemical cell comprising:
    an anode in a single-phase anode electrolyte solution comprising 5-hydroxymethylfurfural;
    a TEMPO mediator immobilized on the anode or dissolved in the single-phase anode electrolyte solution; and
    a cathode in a cathode electrolyte solution, wherein the cathode is in electrical communication with the anode.

11. The electrochemical cell of claim 10, wherein the single-phase anode electrolyte solution is an aqueous electrolyte solution having a pH of less than 12.

12. The electrochemical cell of claim 10, wherein the anode does not comprise platinum, palladium, or gold.

13. The electrochemical cell of claim 10, wherein the single-phase anode electrolyte solution does not serve as an oxygen donor.

14. The electrochemical cell of claim 10, wherein the TEMPO mediator is immobilized on the anode.

* * * * *

UNITED STATES PATENT AND TRADEMARK OFFICE
CERTIFICATE OF CORRECTION

PATENT NO. : 10,655,233 B2
APPLICATION NO. : 15/421750
DATED : May 19, 2020
INVENTOR(S) : Kyoung-Shin Choi et al.

Page 1 of 1

It is certified that error appears in the above-identified patent and that said Letters Patent is hereby corrected as shown below:

In the Specification

Column 5, Line 46:
Delete the phrase "the reduction of water to Hz." and replace with --the reduction of water to $H_2$.--.

Signed and Sealed this
Twenty-ninth Day of September, 2020

Andrei Iancu
*Director of the United States Patent and Trademark Office*